(12) United States Patent
Kuramoto

(10) Patent No.: US 8,089,360 B2
(45) Date of Patent: Jan. 3, 2012

(54) RADIO-FREQUENCY TAG COMMUNICATION DEVICE

(75) Inventor: Katsuyuki Kuramoto, Chigasaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1018 days.

(21) Appl. No.: 11/858,667

(22) Filed: Sep. 20, 2007

(65) Prior Publication Data
US 2008/0224829 A1 Sep. 18, 2008

Related U.S. Application Data

(63) Continuation-in-part of application No. PCT/JP2006/302188, filed on Feb. 8, 2006.

(30) Foreign Application Priority Data

Mar. 28, 2005 (JP) .................................. 2005-090499

(51) Int. Cl.
*G08B 13/14* (2006.01)
(52) U.S. Cl. .................. 340/572.1; 340/572.7; 340/10.1
(58) Field of Classification Search .... 340/572.1–572.8, 340/10.1
See application file for complete search history.

(56) References Cited

U.S. PATENT DOCUMENTS

| | | | | |
|---|---|---|---|---|
| 5,974,301 A * | 10/1999 | Palmer et al. | ................. | 455/63.1 |
| 6,184,841 B1 * | 2/2001 | Shober et al. | ................. | 343/853 |
| 6,539,204 B1 * | 3/2003 | Marsh et al. | ................. | 455/63.1 |
| 6,704,349 B1 * | 3/2004 | Masenten | ...................... | 375/219 |
| 6,745,018 B1 * | 6/2004 | Zehavi et al. | ................. | 455/296 |
| 7,633,435 B2 * | 12/2009 | Meharry et al. | .............. | 342/198 |
| 2002/0085647 A1 * | 7/2002 | Oishi et al. | ..................... | 375/297 |
| 2006/0034162 A1 * | 2/2006 | Jones et al. | ..................... | 370/201 |

FOREIGN PATENT DOCUMENTS

| | | |
|---|---|---|
| JP | H08-122429 A | 5/1996 |
| JP | 973523 A | 3/1997 |
| JP | H10-062518 A | 3/1998 |
| JP | H10-224144 A | 8/1998 |

(Continued)

OTHER PUBLICATIONS

Japan Patent Office; Reasons for Rejection in Japanese Patent Application No. 2005-090499 mailed on Jun. 15, 2010.

*Primary Examiner* — Eric M Blount
(74) *Attorney, Agent, or Firm* — Baker Botts L.L.P.

(57) ABSTRACT

A radio-frequency tag communication device including a receiver array antenna device for receiving a reply signal, a cancel-signal generating portion configured to generate a cancel signal for eliminating a leakage signal that is a part of a transmitted signal, which part is received by the receiver array antenna device, a cancel-signal control portion configured to control a phase and/or an amplitude of the cancel signal generated by the cancel-signal generating portion, and a received-signal combining portion configured to combine together received signals received by a plurality of antenna elements of the receiver array antenna device, to obtain a composite signal, and wherein the transmission of the transmitted signal and the reception of the received signals are concurrently controlled, and the cancel signal generated by the cancel-signal generating portion is applied to the received-signal combining portion, whereby the received signals and the cancel signal are combined together, so that a signal/noise ratio of a wave detector output upon demodulation of the composite signal is improved to increase the maximum distance of communication.

11 Claims, 13 Drawing Sheets

FOREIGN PATENT DOCUMENTS

| | | |
|---|---|---|
| JP | 2001102942 A | 4/2001 |
| JP | 2001217759 A | 8/2001 |
| JP | 2003273831 A | 9/2003 |
| JP | 200480455 A | 3/2004 |
| JP | 2004-112646 A | 4/2004 |
| JP | 2004282522 A | 10/2004 |
| JP | 200572728 A | 3/2005 |
| WO | 2006103834 A1 | 10/2006 |

* cited by examiner

RADIO-FREQUENCY TAG COMMUNICATION DEVICE

The present application is a Continuation-in-Part of International Application No. PCT/JP2006/302188 filed on Feb. 8, 2006, which claims the benefit of Japanese Patent Application No. 2005090499 filed on Mar. 28, 2005.

BACKGROUND OF THE INVENTION

1. Field of the Invention

The present invention relates in general to a radio-frequency tag communication device configured to effect radio communication with radio-frequency tags for writing and reading information on and from the radio-frequency tags, and more particularly to techniques for suppressing a received leakage signal which is a part of a transmitted signal.

2. Description of the Related Art

There is known an RFID (Radio-Frequency Identification) communication system wherein a radio-frequency tag communication device (interrogator) reads out information, in a non-contact fashion, from small-sized radio-frequency tags (transponders) on which desired information is written. In this RFID communication system, the radio-frequency tag communication device is capable of reading out the information from the radio-frequency tags, even where the radio-frequency tags are contaminated or located at positions invisible from the radio-frequency tag communication device. For this reason, the RFID communication system is expected to be used in various fields, such as management and inspection of articles of commodity.

The radio-frequency tag communication device indicated above is usually arranged to transmit a predetermined transmitted signal from an antenna device toward the radio-frequency tags, and to receive through the antenna device a reply signal transmitted from each radio-frequency tag which has received the transmitted signal. Thus, the radio communication is effected between the radio-frequency tag communication device and the radio-frequency tags. Where a receiver antenna device is positioned so as to be able to receive the transmitted signal, a part of the transmitted signal may be received by the receiver antenna device, as a leakage signal of a high strength mixed in a received signal received by the receiver antenna device, giving rise to a problem of a reduced signal/noise ratio of the received signal. In view of this problem, there have been proposed techniques for eliminating the leakage signal received by the receiver antenna device from a transmitter antenna device. Patent Document 1 discloses a direct conversion receiver, as an example of such techniques.

Patent Document 1: JP-2001-102942A

The radio-frequency tag communication device is preferably provided at its receiver portion with a homodyne wave detector circuit as a simple receiver circuit. In the prior art techniques indicated above, it is not possible to sufficiently prevent mixing of a direct component in the detected wave, where the leakage signal transmitted from a transmitter portion is included in the received signal. Accordingly, the signal/noise ratio is lowered, leading to a drawback of a reduced distance of communication. For this reason, there has been a need of developing a radio-frequency tag communication device having a receiver portion which is simple in construction and which is capable of sufficiently eliminating the leakage signal received from a transmitter portion.

SUMMARY OF THE INVENTION

The present invention was made in view of the background art described above. It is an object of this invention to provide a radio-frequency tag communication device having a receiver portion which is simple in construction and which is capable of sufficiently eliminating the leakage signal received from a transmitter portion.

The object described above can be achieved according to the present invention, which provides a radio-frequency tag communication device configured to transmit a transmitted signal toward a radio-frequency tag, and to receive a reply signal transmitted from the radio-frequency tag in response to the transmitted signal, for thereby effecting radio communication with the radio-frequency tag, the radio-frequency tag communication system being characterized by comprising a receiver array antenna device consisting of a plurality of antenna elements each provided for receiving the reply signal, a cancel-signal generating portion configured to generate a cancel signal for eliminating a leakage signal that is a part of the transmitted signal, which part is received by the receiver array antenna device, a cancel-signal control portion configured to control a phase and/or an amplitude of the cancel signal generated by the cancel-signal generating portion, and a received-signal combining portion configured to combine together received signals received by the plurality of antenna elements, to obtain a composite signal, the radio-frequency tag communication device being configured to concurrently control the transmission of the transmitted signal and the reception of the received signals, and to apply the cancel signal generated by the cancel-signal generating portion to the received-signal combining portion, for combining together the received signals and the cancel signal.

ADVANTAGE OF THE INVENTION

The radio-frequency tag communication device of the present invention described above includes the receiver array antenna device consisting of the plurality of antenna elements each provided for receiving the reply signal, the cancel-signal generating portion configured to generate the cancel signal for eliminating the leakage signal that is a part of the transmitted signal, which part is received by the receiver array antenna device, the cancel-signal control portion configured to control the phase and/or the amplitude of the cancel signal generated by the cancel-signal generating portion, and the received-signal combining portion configured to combine together received signals received by the plurality of antenna elements, to obtain a composite signal. The present radio-frequency tag communication device is configured to concurrently control the transmission of the transmitted signal and the reception of the received signals, and to apply the cancel signal generated by the cancel-signal generating portion to the received-signal combining portion, for combining together the received signals and the cancel signal, so that a signal/noise ratio of a wave detector output upon demodulation of the composite signal is improved to increase the maximum distance of communication. Namely, the present invention provides a radio-frequency tag communication device having a receiver portion which is simple in construction and which is capable of sufficiently eliminating the leakage signal received from a transmitter portion.

Further, unlike a radio-frequency tag communication device wherein the cancel signal is generated for each of a plurality of antenna elements of a receiver array antenna device, the present radio-frequency tag communication device is configured to apply the cancel signal generated by the cancel-signal generating portion, to the received-signal combining portion which combines together the received signals received by the plurality of antenna elements of the receiver array antenna device, so that the present radio-frequency tag communication device does not require a plurality of cancel-signal generating portions, a plurality of cancel-signal control portions and a plurality of cancel-signal combining portions, whereby the receiver portion including the array antenna device can be simplified in construction, but is capable of sufficiently eliminating the leakage signal received from the transmitter portion.

In addition, the present invention has an advantage of improved accuracy of detection of the direction of reception of an electric wave on the basis of a direction of a main lobe in which the amplitude of the composite signal obtained by the received-signal combining portion is maximum. Accordingly, the direction in which the radio-frequency tag exists can be accurately detected on the basis of the reply signal transmitted from the radio-frequency tag in response to the transmitted signal.

Preferably, the radio-frequency tag communication device further comprises a directivity control portion configured to control a directivity of reception of the reply signal. In this case, the maximum distance of communication with the radio-frequency tag can be maximized by controlling the directivity of communication with the radio-frequency tag.

Preferably, the directivity control portion controls the directivity of reception, by controlling phases of the received signals received by the plurality of antenna elements. In this case, the maximum distance of communication can be maximized by controlling the directivity of reception of the reply signal transmitted from the radio-frequency tag.

Preferably, the cancel-signal control portion sets an initial value of the phase and/or the amplitude of the cancel signal, on the basis of the directivity of reception of the reply signal controlled by the directivity control portion. In this case, the initial value of the phase and/or the amplitude of the cancel signal can be suitably determined.

Preferably, the radio-frequency tag communication device further comprises a composite-signal amplifying portion configured to amplify the composite signal obtained by the received-signal combining portion, a demodulating portion configured to demodulate the composite signal amplified by the composite-signal amplifying portion, a wave-detector-output-level detecting portion configured to detect a wave detector output level of a demodulated signal generated by the demodulating portion, and an amplification-ratio setting portion configured to set a ratio of amplification of the composite signal by the composite-signal amplifying portion, according to the wave detector output level detected by the wave-detector-output-level detecting portion, so that the composite-signal amplifying portion amplifies the composite signal at the amplifying ratio set according to the wave detector output level detected by the wave-detector-output-level detecting portion. In this case, the amplification ratio of the composite signal is suitably determined by reference to the wave detector output level, so that the resolution at an A/D converting portion to covert the demodulated signal into a digital signal can be maximized.

Preferably, the cancel-signal control portion updates the phase and/or the amplitude of the cancel signal, at a time interval shorter than a period of a modulated signal included in the received signals, while the ratio of amplification of the composite signal is lower than a predetermined value. In this case, the phase and/or the amplitude of the cancel signal can be suitably controlled by obtaining the direct current component at the sampling interval, before the degree of suppression of the leakage signal is comparatively small.

Preferably, the cancel-signal control portion updates the phase and/or the amplitude of the cancel signal, at a time interval not shorter than a period of a modulated signal included in the received signals, while the ratio of amplification of the composite signal is not lower than a predetermined value. In this case, the phase and/or the amplitude of the cancel signal can be suitably controlled by calculating the direct current component from an average of the amplitude of a reflected wave component during the time interval not shorter than the period of the modulated signal, after the degree of suppression of the leakage signal is comparatively large.

Preferably, the amplification-ration setting portion sets the radio of amplification of the composite signal by the composite-signal amplifying portion each time the phase and/or the amplitude of the cancel signal is/are updated by the cancel-signal control portion. In this case, the resolution at an A/D converting portion to covert the demodulated signal into a digital signal can be maximized.

Preferably, the demodulating portion is configured to perform orthogonal I-Q modulation of the composite signal amplified by the composite-signal amplifying portion, for thereby converting the composite signal into an I-phase signal and a Q-phase signal, and the cancel-signal control portion controls the phase and/or the amplitude of the cancel signal, on the basis of a higher one of levels of the I-phase and Q-phase signals generated by the demodulating portion, or on the basis of a level of a composite signal of the I-phase and Q-phase signals. In this case, the cancel signal can be practically controlled.

Preferably, the cancel-signal control portion controls the phase and/or the amplitude of the cancel signal, so as to minimize a direct wave component of the wave detector output level detected by the wave-detector-output-level detecting portion. In this case, the cancel signal can be practically controlled.

Preferably, the cancel-signal control portion is configured to first transmit a carrier wave not including any command, toward the radio-frequency tag, to perform a provisional control of the cancel signal on the basis of the reply signal transmitted from the radio-frequency tag in response to the carrier wave, to transmit the transmitted signal including a predetermined command, toward the radio-frequency tag, and to perform a final control of the cancel signal on the basis of the reply signal transmitted from the radio-frequency tag in response to the transmitted signal. In this case, the provisional control of the cancel signal is implemented on the basis of the wave detector output not requiring a decoding operation of the reply signal, prior to the final control of the cancel signal, so that the leakage signal can be more efficiently eliminated.

Preferably, the radio-frequency tag communication device further comprises a transmitter array antenna device consisting of a plurality of antenna elements each provided for transmitting the transmitted signal, and the directivity control portion controls a directivity of transmission of the transmitted signal, by controlling a phase of the transmitted signal to be transmitted from each of the plurality of antenna elements of the transmitter array antenna device. In this case, the maximum distance of communication can be maximized by controlling the directivity of transmission of the transmitted signal.

Preferably, the cancel-signal control portion sets an initial value of the phase and/or the amplitude of the cancel signal, on the basis of the directivity of transmission of the transmitted signal controlled by the directivity control portion. In this case, the initial value of the phase and/or the amplitude of the cancel signal can be suitably determined.

BRIEF DESCRIPTION OF THE DRAWING

The above and other objects, features, advantages and technical and industrial significance of this invention will be better understood by reading the following detailed description of preferred embodiments of the invention, when considered in connection with the accompanying drawings, in which.

NOMENCLATURE OF REFERENCE SIGNS

Figure 1:
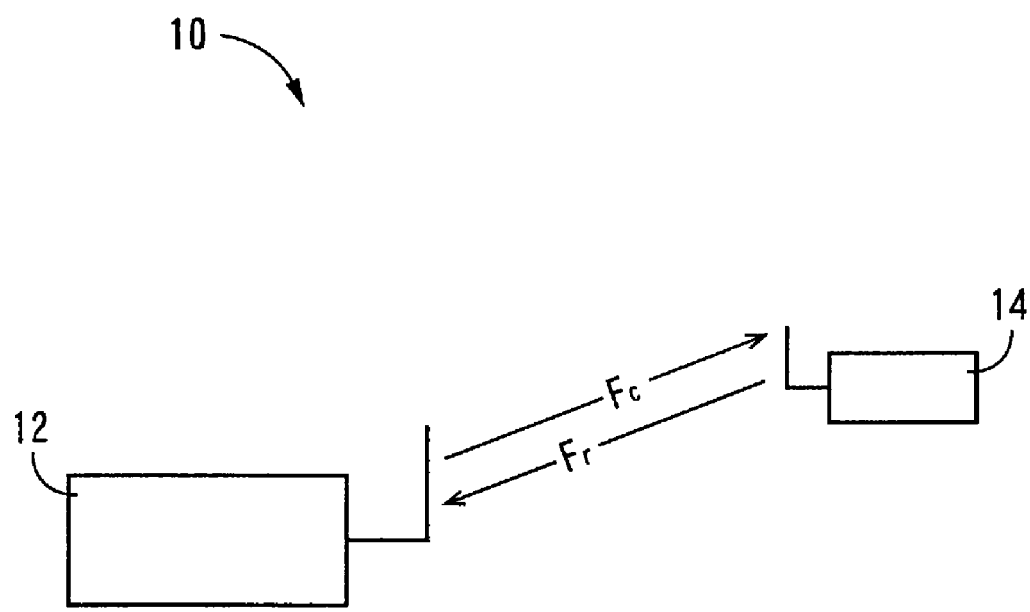
FIG. 1 is a view showing a radio-frequency tag communication system to which the present invention is suitably applicable.

10: Radio-frequency tag communication system, 12: Radio-frequency tag communication device, 14: Radio-frequency tag, 16: Transmitted-data generating portion, 18: Transmission memory portion, 20: Transmitter/receiver antenna elements, 22: Carrier-wave generating portion, 24: Carrier-wave amplifying portion, 26: Transmitter/receiver module, 28: Cancel-signal-amplitude control portion, 30: Cancel-signal-phase control portion, 32: Receiver-signal combining portion, 34: Composite-signal amplifying portion, 36: Homodyne wave detector portion (Demodulating portion), 38: First wave-detection-signal amplifying portion, 40: DC-component eliminating portion, 42: First wave-detection-signal A/D converting portion, 44: Reception memory portion, 46: Reply-data interpreting portion, 48: Second wave-detection-signal amplifying portion, 50: Second wave-detection-signal A/D converting portion, 51: Detected-wave-level calculating portion, 52: Cancel-signal-control memory portion, 54: Cancel-signal control portion (Wave-detector-output-level detecting portion; Amplification-ratio setting portion), 56: Directivity control portion, 58: Array antenna device, 60: Cancel-signal generating portion, 62: Leakage carrier eliminating portion, 72: Received-signal-phase control portion, 74: Antenna portion, 76: IC-circuit portion, 78: Rectifying portion, 80: Power source portion, 82: Clock extracting portion, 84: Memory portion, 86: Modulating/demodulating portion, 88: Control portion, 90: I-phase converting portion, 92: I-phase BPF, 94: I-phase amplifying portion, 96: Q-phase converting portion, 98: Q-phase BPF, 100: Q-phase amplifying portion, 102: Demodulated-signal generating portion

DETAILED DESCRIPTION OF THE PREFERRED EMBODIMENTS

Referring to the drawings, a preferred embodiment of this invention will be described in detail.

First Embodiment

Referring first to FIG. 1, there is shown a radio-frequency tag communication system 10 to which the present invention is suitably applicable. This radio-frequency tag communication system 10 is a so-called "RFID (Radio-Frequency Identification) system consisting of a radio-frequency tag communication device 12 according to one embodiment of this invention, and at least one radio-frequency tag 14 (one radio-frequency tag 14 shown in FIG. 1) each of which is a communication object for radio communication with the radio-frequency tag communication device 12. The radio-frequency tag communication device 12 functions as an interrogator of the RFID system, while the radio-frequency tag 14 functions as a transponder of the RFID system. Described in detail, the radio-frequency tag communication device 12 is arranged to transmit an interrogating wave $F_c$ (transmitted signal) toward the radio-frequency tag 14, and the radio-frequency tag 14 which has received the interrogating wave $F_c$ modulates the received interrogating wave $F_c$ according to a predetermined information signal (data) to generate a reply wave $F_r$ (reply signal) to be transmitted toward the radio-frequency tag communication device 12, whereby radio communication is effected between the radio-frequency tag communication device 12 and the radio-frequency tag 14.

Figure 2:
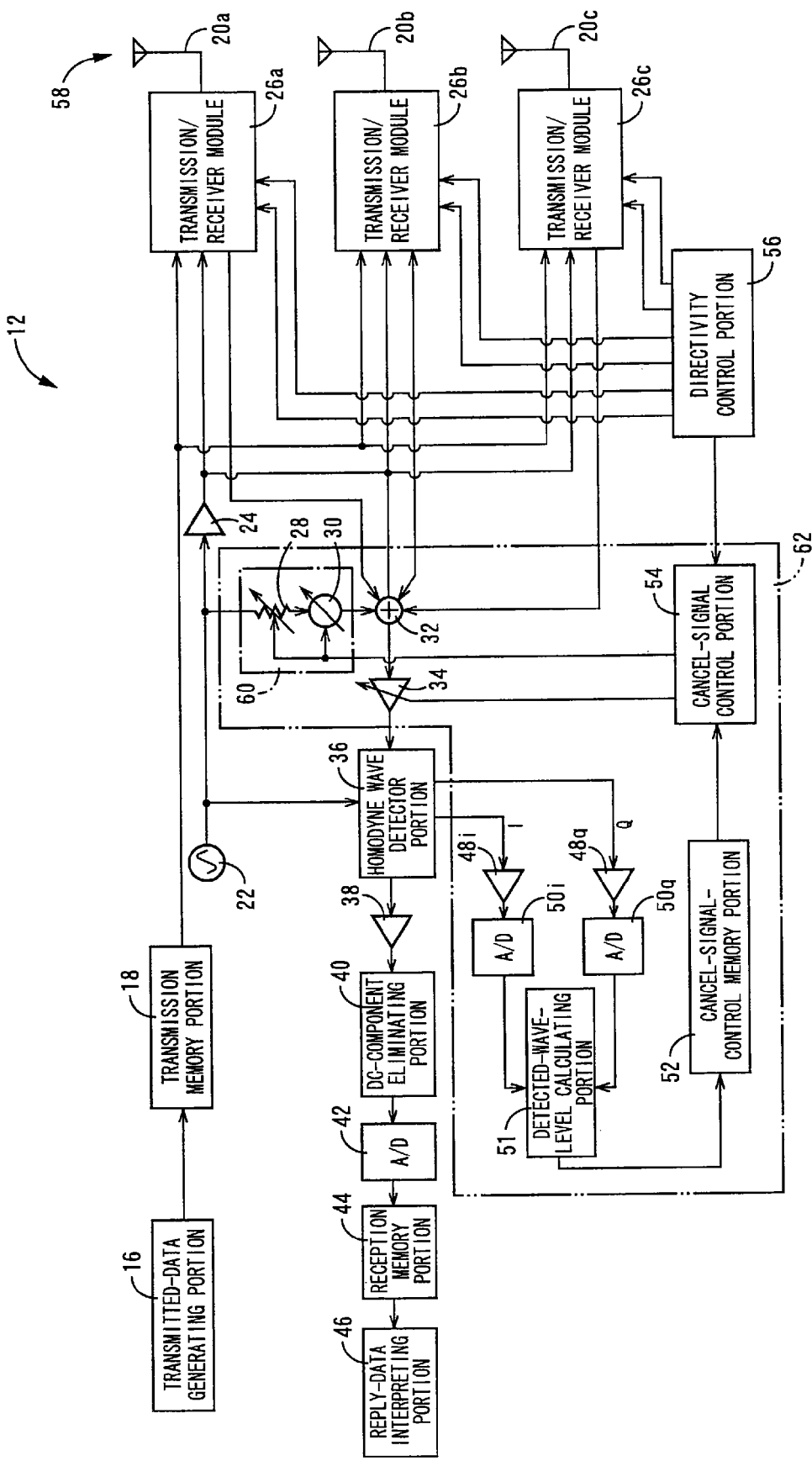
FIG. 2 is a view for explaining an arrangement of one embodiment of a radio-frequency tag communication device of the present invention.

Referring next to FIG. 2, there is shown an arrangement of the radio-frequency tag communication device 12 of the present embodiment, As shown in FIG. 2, the radio-frequency tag communication device 12 includes: a transmitted-data generating portion 16 configured to generate transmitted data (transmitted information) to be transmitted to the radio-frequency tag 14; a transmission memory portion 18 functioning as a memory device for storing the transmitted data generated by the transmitted-data generating portion 16; a plurality of (three in the example of FIG. 2) transmitter/receiver antenna elements 20a, 20b and 20c (hereinafter collectively referred to as "transmitter/receiver antenna elements 20", unless otherwise specified) functioning as transmitter/receiver antenna elements operable to transmit the interrogating wave $F_c$ (transmitted signal) toward the radio-frequency tag 14, and to receive the reply wave $F_r$ (reply signal) transmitted from the radio-frequency tag 14 in response to the interrogating wave $F_c$; a carrier-wave generating portion 22 configured to generate a carrier wave of the interrogating wave $F_c$; a carrier-wave amplifying portion 24 configured to amplify the carrier wave generated by the carrier-wave generating portion 22; and a plurality of (three in the example of FIG. 2) transmitter/receiver modules 26a, 26b and 26c (hereinafter collectively referred to as "transmitter/receiver modules 26", unless otherwise specified) each configured to control a phase of the carrier wave received from the carrier-wave amplifying portion 24, modulate the carrier wave according to the transmitted data read out from the transmission memory portion 18, and transmit the modulated carrier wave as the interrogating wave $F_c$ from the corresponding transmitter/receiver antenna element 20, and to control a phase of the reply wave $F_r$ transmitted from the radio-frequency tag 14 in response to the interrogating wave $F_c$, and to apply the reply wave $F_r$ to a received-signal combining portion 32.

The radio-frequency tag communication device 12 further includes: a cancel-signal-amplitude control portion 28 configured to control an amplitude of a cancel signal in the form of the carrier wave generated by the carrier-wave generating portion 22; a cancel-signal-phase control portion 30 configured to control a phase of the cancel signal received from the cancel-signal-amplitude control portion 28, and to apply the cancel signal to the received-signal combining portion 32; the above-indicated received-signal combining portion 32 configured to combine together (sum up) the received signals received from the plurality of transmitter/receiver modules 26, and the cancel signal received from the cancel-signal-phase control portion 30, for generating a composite signal; a composite-signal amplifying portion 34 configured to amplify the composite signal received from the received-signal combining portion 32; a homodyne wave detector portion 36 configured to perform homodyne wave detection of the composite signal received from the composite-signal amplifying portion 34, according to the carrier wave generated by the carrier-wave generating portion 22; a first detected-wave-signal amplifying portion 38 configured to amplify an output signal of the homodyne wave detector portion 36; a DC-component eliminating portion 40 configured to eliminate a DC component (direct current component) of the output signal amplified by the first detected-wave-signal amplifying portion 38; a first detected-wave-signal A/D converting portion 42 configured to convert an output signal of the DC-component eliminating portion 40, into a digital signal; a reception memory portion 44 functioning as a memory device for storing the digital signal received from the first detected-wave-signal A/D converting portion 42; and a reply-data interpreting portion 46 configured to read out the digital signal from the reception memory portion 44, and to interpret reply data received from the radio-frequency tag 14. The DC-component eliminating portion 40 may be a DC filter for eliminating a direct wave component not eliminated by a leakage-carrier-wave eliminating portion 62 which will be described.

Figure 17:
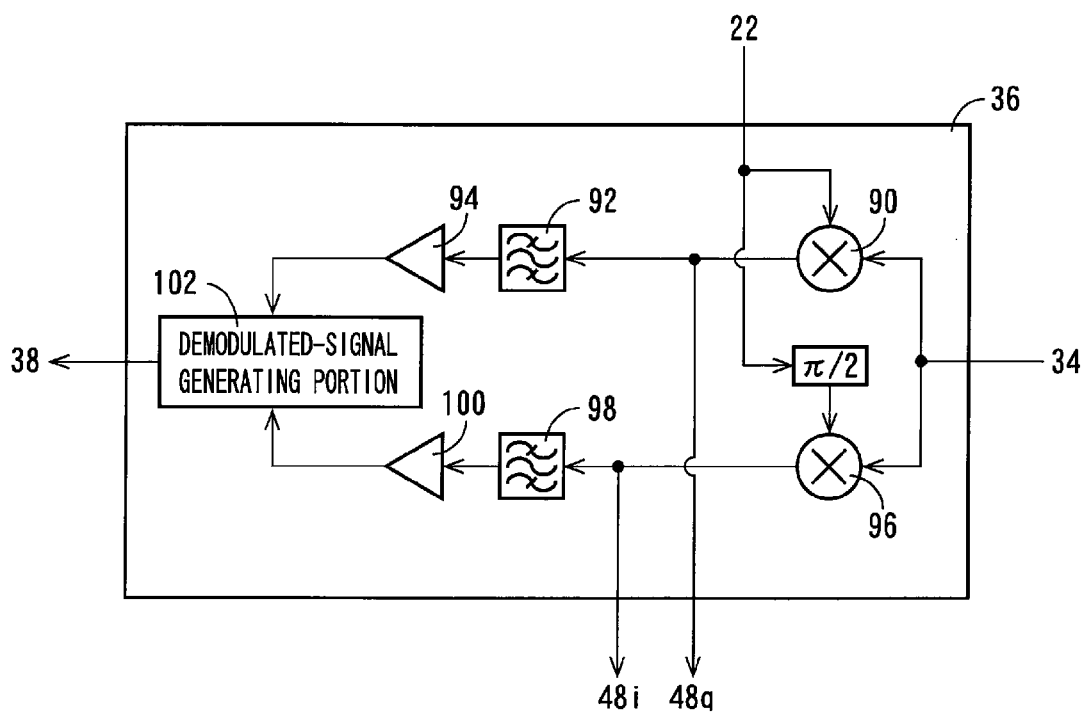
FIG. 17 is a view showing in detail an arrangement of a homodyne wave detector portion provided in the radio-frequency tag communication device of FIG. 2.

FIG. 17 shows in detail an arrangement of the homodyne wave detector portion 36 described above. The homodyne wave detector portion 36 is configured to perform orthogonal I-Q modulation of an input signal, namely, to convert the input signal into an I-phase (In-phase) signal and a Q-phase (Quadrature-phase) signal having a phase difference of 90°, and to combine together the I-phase and Q-phase signals, for thereby demodulating the received signal described above. As shown in FIG. 17, the homodyne wave detector portion 36 has functional portions including: an I-phase converting portion 90 configured to convert the composite signal received from the composite-signal amplifying portion 34, into the I-phase signal; an I-phase BPF (Band Pass Filter) 92 configured to pass a predetermined frequency band of the I-phase signal received from the I-phase converting portion 90; an I-phase amplifying portion 94 configured to amplify the I-phase signal received from the I-phase BPF 92; a Q-phase converting portion 96 configured to convert the composite signal received from the composite-signal amplifying portion 34, into the Q-phase signal; a Q-phase BPF (Band Pass Filter) 98 configured to pass a predetermined frequency band of the Q-phase signal received from the Q-phase converting portion 96; a Q-phase amplifying portion 100 configured to amplify the Q-phase signal received from the Q-phase BPF 98; and a demodulated-signal generating portion 102 configured to combine together the I-phase signal received from the I-phase amplifying portion 94 and the Q-phase signal received from the Q-phase amplifying portion 100, for generating a demodulated signal. The demodulated signal generated by the demodulated-signal generating portion 102 is applied to the first detected-wave-signal amplifying portion 38, and the I-phase signal generated by the I-phase converting portion 90 is applied to an I-phase detected-wave-signal amplifying portion 48i described below, while the Q-phase signal generated by the Q-phase converting portion 96 is applied to a Q-phase detected-wave-signal amplifying portion 48q described below.

Referring back to FIG. 2, the radio-frequency tag communication device 12 further includes; an I-phase detected-wave-signal amplifying portion 48i configured to amplify the I-phase signal received from the homodyne wave detector portion 36; an I-phase detected-wave-signal A/D converting portion 50i configured to convert the I-phase signal amplified by the I-phase detected-wave-signal amplifying portion 48i, into a digital signal; a Q-phase detected-wave-signal amplifying portion 48q configured to amplify the Q-phase signal received from the homodyne wave detector portion 36; a Q-phase detected-wave-signal A/D converting portion 50q configured to convert the Q-phase signal amplified by the Q-phase detected-wave-signal amplifying portion 48q, into a digital signal; a detected-wave-level calculating portion 51 configured to calculate a higher one of levels of the digital I-phase and Q-phase signals generated by the I-phase and Q-phase detected-wave-signal A/D converting portions 50i and 50q, or a level of a composite signal of the digital I-phase and Q-phase signals; a cancel-signal-control memory portion 52 for storing the output signal of the detected-wave-level calculating portion 51 (indicative of the level of the wave detector output signal), which output signal is used to control the cancel signal; a cancel-signal control portion 54 configured to control the phase and/or the amplitude of the cancel signal by controlling the settings of the above-described cancel-signal-amplitude control portion 28 and the cancel-signal-phase control portion 30, on the basis of the wave detector output signal read out from the cancel-signal-control memory portion 52, and also functioning as an amplification-ratio setting portion to control the amplification ratio of the composite-signal amplifying portion 34; and a directivity control portion 56 configured to at least one of the directivity of transmission of the transmitted signal and the directivity of reception of the received signal, by controlling the settings of the plurality of transmitter/receiver modules 26 to control the phase of the transmitted signal to be transmitted from each transmitter/receiver antenna element 20 and the phase of the received signal received by each transmitter/receiver antenna element 20. It is noted that the plurality of transmitter/receiver antenna elements 20 cooperate to constitute a transmitter/receiver array antenna device 58, while the cancel-signal-amplitude control portion 28 and the cancel-signal-phase control portion 30 cooperate to constitute a cancel-signal generating portion 60 configured to generate a cancel signal for eliminating the leakage signal that is a part of the transmitted signal, which part is received by the array antenna device 58. It is also noted that the cancel-signal generating portion 60, the received-signal combining portion 32, the composite-signal amplifying portion 34, the I-phase detected-wave-signal amplifying portion 48$i$, the I-phase detected-wave-signal A/D converting portion 50$i$, the Q-phase detected-wave-signal amplifying portion 48$q$, the Q-phase detected-wave-signal A/D converting portion 50$q$, the detected-wave-level calculating portion 51, the cancel-signal-control memory portion 52 and the cancel-signal control portion 54 cooperate to constitute a leakage-carrier-wave eliminating portion 62. It is further noted that the cancel-signal control portion 54 also functions as a wave-detector-output-level detecting portion configured to detect the wave detector output level of the detected wave signal (modulated signal) generated by the homodyne wave detector portion 36.

Figure 3:
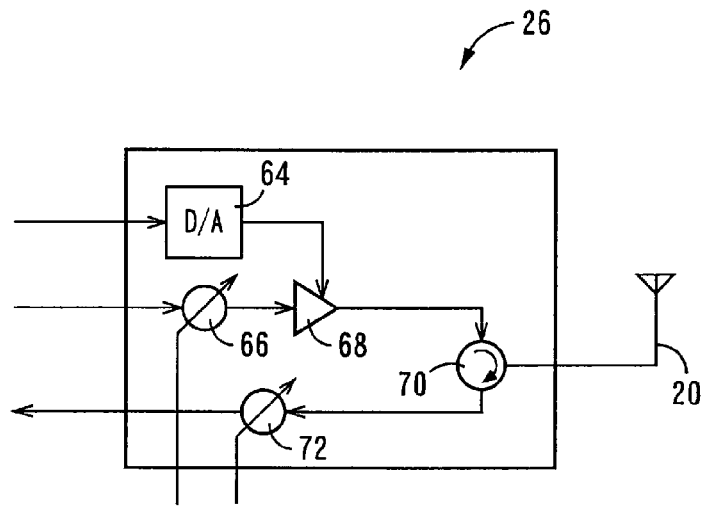
FIG. 3 is a view showing in detail an arrangement of a transmitter/receiver module provided in the radio-frequency tag communication device of FIG. 2.

FIG. 3 shows in detail an arrangement of each transmitter/receiver module 26. As shown in FIG. 3, the transmitter/receiver module 26 includes: a transmitted-data D/A converting portion 64 configured to convert the transmitted data read out from the transmission memory portion 18, into an analog signal; a carrier-phase control portion 66 configured to control the phase of the carrier wave generated by the carrier-wave amplifying portion 24, according to a control signal received from the directivity control portion 56; a modulating portion 68 configured to AM-modulate the carrier wave received from the carrier-phase control portion 66, according to the analog signal received from the transmitted-data D/A converting portion 64; a transmission/reception switching portion 70 configured to apply the modulated transmitted signal received from the modulating portion 68, to the corresponding transmitter/receiver antenna element 20, and to apply the received signal received from the transmitter/receiver antenna element 20, to a received-signal-phase control portion 72; and the received-signal-phase control portion 72 configured to control the phase of the received signal received from the transmission/reception switching portion 70, according to the control signal received from the directivity control portion 56, and to apply the phase-controlled received signal to the received-signal combining portion 32. The transmission/reception switching portion 70 may be a circulator or a directional coupler.

Figure 4:
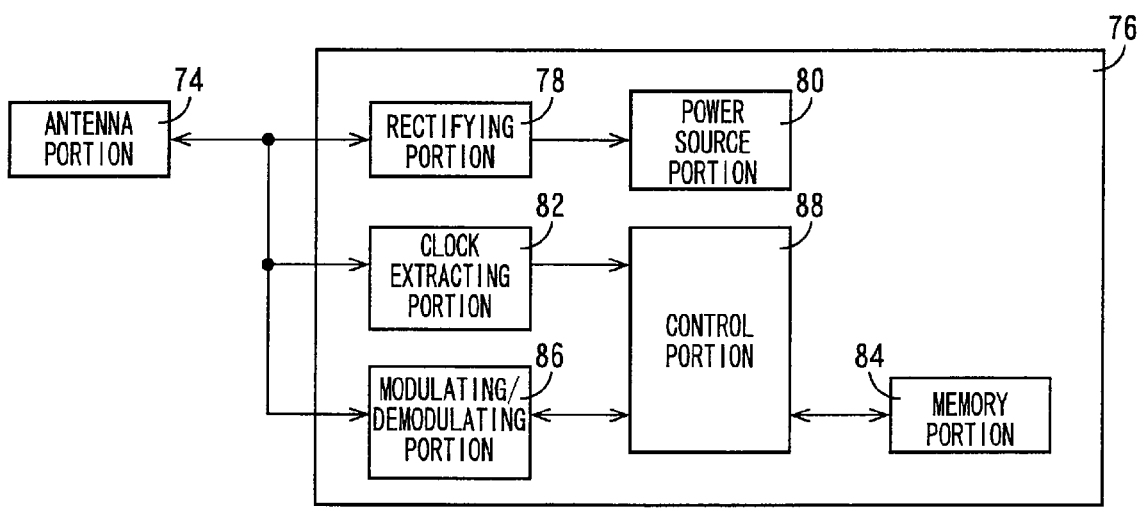
FIG. 4 is a view showing an arrangement of a communication object in the form of a radio-frequency tag with which the radio-frequency tag communication device of FIG. 2 is provided to effect radio communication.

Reference is now made to FIG. 4 showing an arrangement of the radio-frequency tag 14. As shown in FIG. 4, the radio-frequency tag 14 includes an antenna portion 74 for signal transmission and reception to and from the radio-frequency tag communication device 12, and an IC-circuit portion 76 configured to process a received signal received by the antenna portion 74. The IC-circuit portion 76 includes as functional portions thereof a rectifying portion 78 configured to rectify the interrogating wave $F_c$ (transmitted signal) received by the antenna portion 74 from the radio-frequency tag 12; a power source portion 80 for storing an energy of the interrogating wave $F_c$ rectified by the rectifying portion 78; a clock extracting portion 82 for extracting a clock signal from the carrier wave received by the antenna portion 74, and applying the extracted clock signal to a control portion 88; a memory portion 84 functioning as an information memory portion capable of storing desired information signals; a modulating/demodulating portion 86 connected to the antenna portion 74 and configured to perform signal modulation and demodulation; and the above-indicated control portion 88 configured to control the operation of the radio-frequency tag 14 via the above-described rectifying portion 78, clock extracting portion 82 and modulating/demodulating portion 86. The control portion 88 performs basic controls such as a control operation to store the desired information in the memory portion 84, as a result of the radio communication with the radio-frequency tag communication device 12, and a control operation to control the modulating/demodulating portion 86 for generating the reply wave $F_r$ (reply signal) by modulating the interrogating wave $F_c$ received by the antenna portion 74, on the basis of the information signal stored in the memory portion 84, and to transmit the generated reply wave $F_r$ as a reflected signal from the antenna portion 74.

Figure 5:
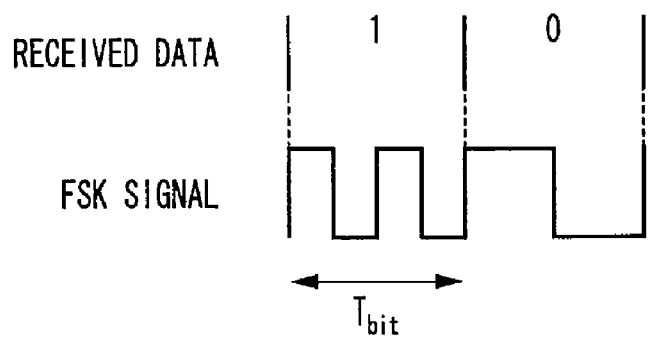
FIG. 5 is a view for explaining an information signal used by the radio-frequency tag of FIG. 4 to transmit a reply signal.

FIG. 5 is a view for explaining an information signal used by the radio-frequency tag 14 to transmit the reply signal. The information signal (reply information) used by the radio-frequency tag 14 to transmit the reply signal is a string of bits FSK-encoded on the basis of signals "1" and "0" indicated in FIG. 5. On the basis of the FSK-encoded bits, the carrier wave received from the radio-frequency tag communication device 12 is reflection-modulated into the reply wave $F_r$. For example, the information signal includes an identification (ID) code specific to the radio-frequency tag 14, and is detected by the homodyne detector portion 36 of the radio-frequency tag communication device 12, and interpreted by the reply-data interpreting portion 46, to identify the radio-frequency tag 14. Each of the signals "1" and "0" has a predetermined bit length $T_{bit}$.

Figure 6:
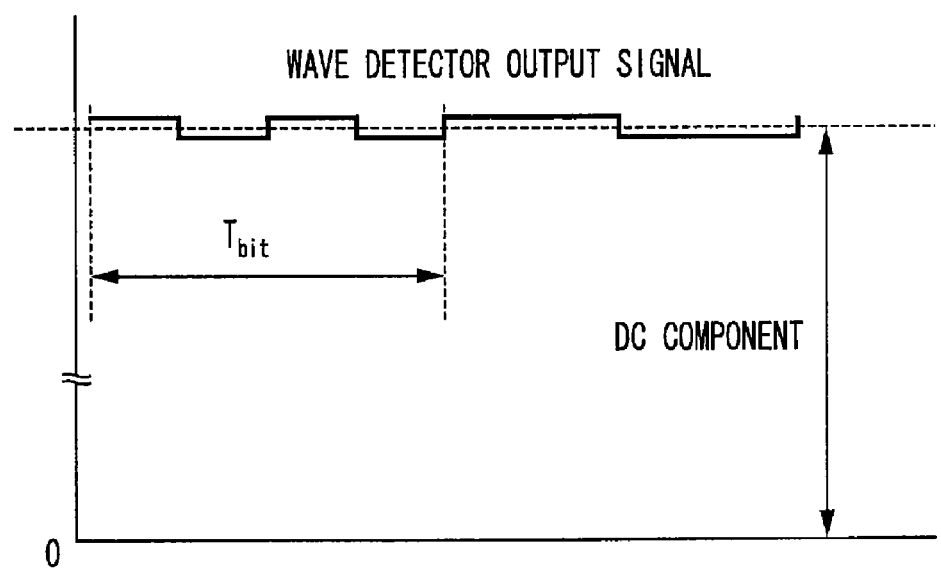
FIG. 6 is a view illustrating a digital signal (detected wave signal) generated by a homodyne wave detector portion of the radio-frequency tag communication device of FIG. 2.
Figure 7:
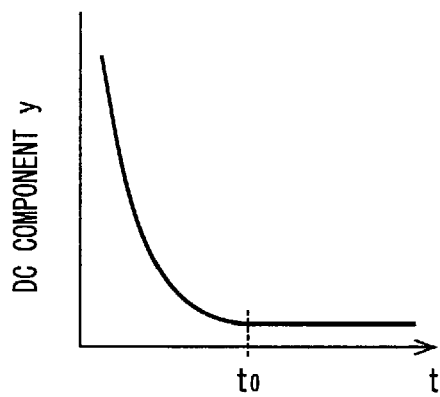
FIG. 7 is a view for explaining suppression of a direct wave component by controlling a cancel signal in the radio-frequency tag communication device of FIG. 2.

FIG. 6 is a view illustrating the digital signal (wave detector output signal) generated by the homodyne wave detector portion 36. The wave detector output signal indicated in FIG. 6 is obtained as a result of homodyne wave detection of the reply wave $F_r$ which is generated by the radio-frequency tag 14 by reflection modulation of the carrier wave on the basis of the signals "1" and "0" indicated in FIG. 5. It will be understood that the wave detector output signal has an extremely large direct wave component (DC component) as compared with a change of the amplitude reflecting the signals "1" and "0". This direct wave component is the leakage signal that is a part of the transmitted signal, which part is received by the receiver antenna device in the form of the array antenna device 58. To assure correct reading of the information relating to the modulation by the radio-frequency tag 14, it is necessary to increase the amount of change of the amplitude reflecting the modulated signal received from the radio-frequency tag 14, by suppressing or eliminating the above-indicated direct wave component as much as possible, while the phase and/or amplitude of the cancel signal is/are changed or updated by the cancel-signal control portion 54. The radio-frequency tag communication device 12, which is arranged to concurrently control the transmission of the transmitted signal and the reception of the received signals, is configured such that the cancel signal generated by the cancel-signal generating portion 60 is applied to the received-signal combining portion 32, so as to be mixed with the received signal, for thereby suppressing the direct wave component included in the received signal, that is, the leakage signal that is a received part of the transmitted signal. Described in detail, an amplification ratio G of the composite signal at the composite-signal amplifying portion 34 is controlled according to the wave detector output level detected by the cancel-signal control portion 54 functioning as a wave-detector-output-level detecting portion, while at the same time the settings of the cancel-signal-amplitude control portion 28 and the cancel-signal-phase control portion 30 are controlled according to a well known recurrence formula, such that the phase and/or the amplitude of the cancel signal generated by the cancel-signal generating portion 60 is/are converged. In the example indicated by a graph of FIG. 7, the direct wave component is converged at a point of time $t_0$, and is thereafter kept suppressed at a low level. The cancel-signal control portion 54 continues to update the settings of the cancel-signal-amplitude control portion 28 and the cancel-signal-phase control portion 30 until the direct wave component has been stabilized at a low level at the point of time $t_0$. The initial values of those settings are preferably determined on the basis of at least one of the directivity of transmission of the transmitted signal and the directivity of reception of the reply signal, which are controlled by the directivity control portion 56.

Figure 8:
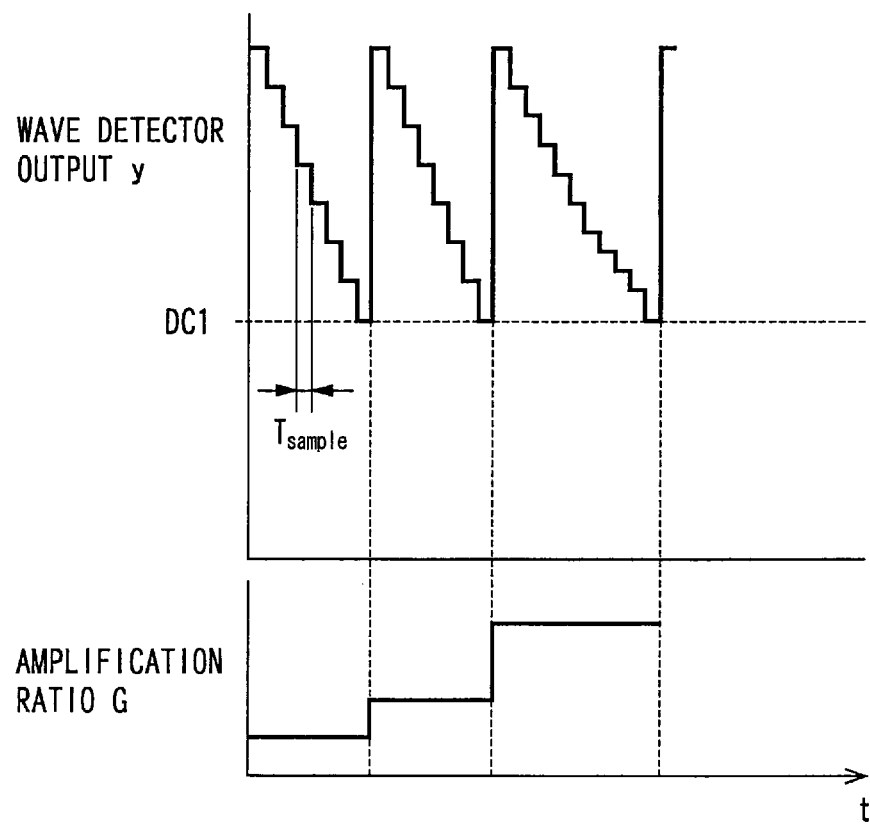
FIG. 8 is a view for explaining the control of the cancel signal by a cancel-signal control portion, where a ratio of amplification of a composite signal by a composite-signal amplifying portion of the radio-frequency tag communication device is comparatively low.

FIG. 8 is a view for explaining the control of the amplification ratio G of the composite signal at the composite-signal amplifying portion 34. An upper graph in the view indicates an output signal y of the detected-wave-level calculating portion 51, while a lower graph in the view indicates the amplification ratio G at the composite-signal amplifying portion 34. As indicated in FIG. 8, the amplification ratio G of the composite signal at the composite-signal amplifying portion 34 is increased each time the level of the output signal y of the detected-wave-level calculating portion 51 has been lowered to a predetermined value DC1, so that the resolution of the detected-wave-signal A/D converting portions 50$i$ and 50$q$ is increased.

Figure 9:
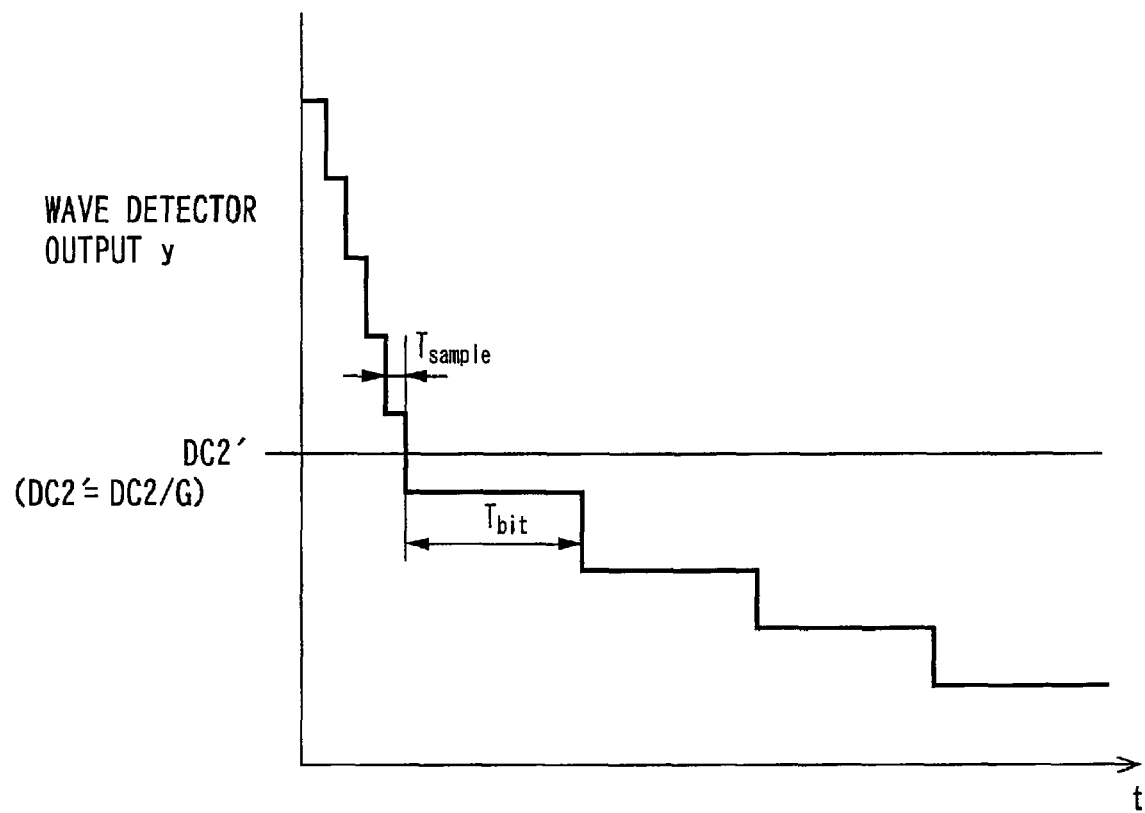
FIG. 9 is a view for explaining the control of the cancel signal by the cancel-signal control portion, where the amplification ratio of the composite signal by the composite-signal amplifying portion of the radio-frequency tag communication device is comparatively high.
Figure 10:
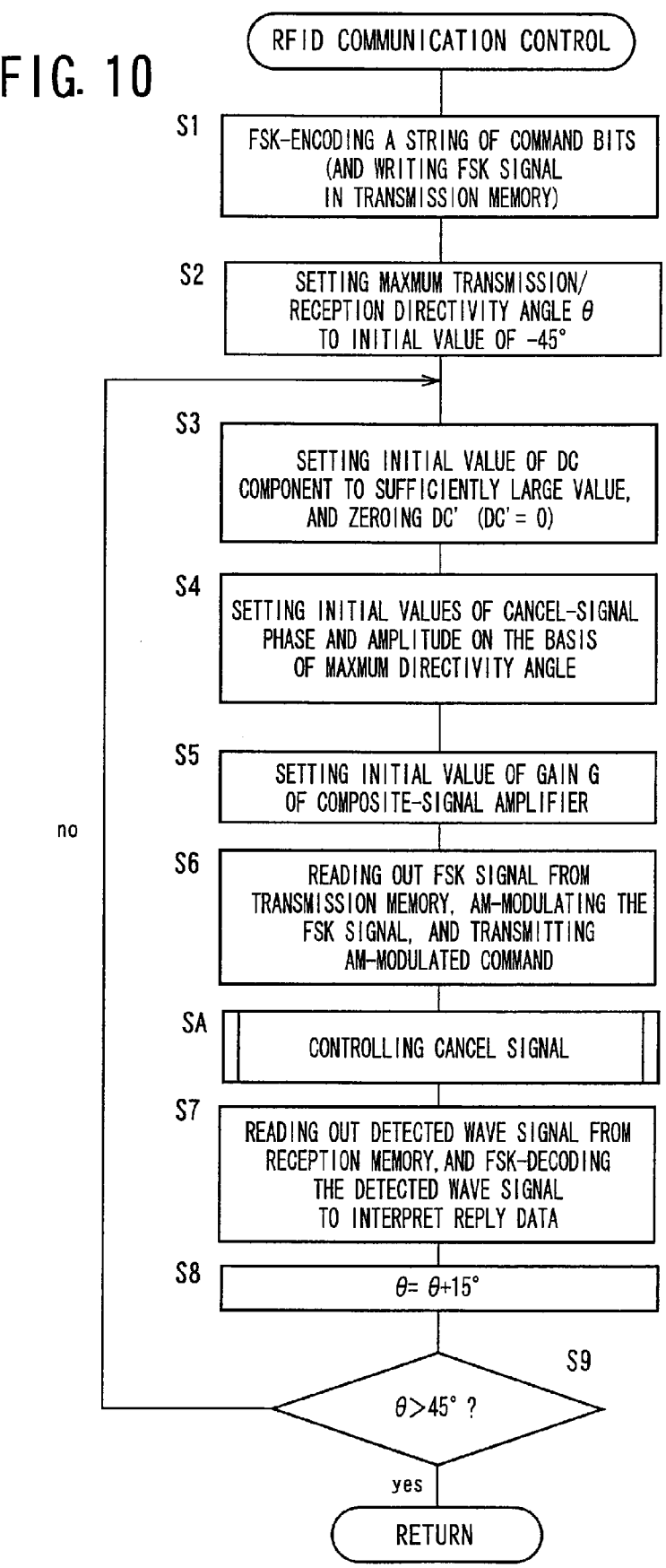
FIG. 10 is a flow chart illustrating an RFID communication control for radio communication of the radio-frequency tag communication device of FIG. 2 with the radio-frequency tag of FIG. 3.

FIG. 9 is a view for explaining the control of the cancel signal by the cancel-signal control portion 54, and indicates the output signal y of the detected-wave-level calculating portion 51. As indicated in FIG. 9, the cancel-signal control portion 54 updates the phase and/or the amplitude of the cancel signal at a time interval (e.g., one sampling time period $T_{sample}$) shorter than the period of the modulated signal included in the received signal, while the amplitude of the wave detector output is equal to or larger than a predetermined value, where the amplification ratio G of the composite signal at the composite-signal amplifying portion 34 is comparatively low. Where the amplification ratio G of the composite signal at the composite-signal amplifying portion 34 is comparatively high, the cancel-signal control portion 54 updates the phase and/or the amplitude of the cancel signal at a time interval (e.g., one bit time period $T_{bit}$) not shorter than the period of the modulated signal included in the received signal, while the amplitude of the wave detector output is equal to or larger than the predetermined value. For instance, after the level of the output signal y of the detected-wave-level calculating portion 51 has been lowered to a predetermined value DC2' (=DC2/G) determined in view of the amplification ratio G of the composite signal at the composite-signal amplifying portion 34, the cancel-signal control portion 54 controls the phase and/or the amplitude of the cancel signal, so as to obtain the direct wave component from an average of the amplitude of the reflected wave component during the one bit time period $T_{bit}$. When the leakage signal that is the part of transmitted signal, which part is received by the receiver array antenna device in the form of the array antenna device 58, is not sufficiently suppressed, the amount of change of the amplitude reflecting the modulated signal received from the radio-frequency tag 14 is small as compared with the direct wave component. Therefore, the direct wave component obtained at the sampling interval can be suppressed at a rate as high as possible. When sufficient suppression of the leakage signal of the transmitted signal received by the array antenna device 58 is initiated, the amount of change of the amplitude reflecting the modulated signal received from the radio-frequency tag 14 has become considerably large, so that the modulated signal included in the received signal can be efficiently read by controlling the cancel signal at a time interval not shorter than the period of the modulated signal. It is noted that the control of the amplification ratio described above by reference to FIG. 8, and the control of the cancel signal described above by reference to FIG. 9 are implemented concurrently, as described below by reference to the flow charts FIG. 10 is a flow chart illustrating an RFID communication control for radio communication of the radio-frequency tag communication device 12 with the radio-frequency tag 14. This RFID communication control is repeatedly executed with a predetermined cycle time.

The RFID communication control is initiated with step S1 ("step" being hereinafter omitted) in which transmitted data (a string of command bits) to be transmitted to the radio-frequency tag 14 are generated by the transmitted-data generating portion 16, and are FSK-encoded and written in the transmission memory portion 18. Then, the control flow goes to S2 in which the initial value of a maximum transmission/reception directivity angle θ is set to −45°. The control flow then goes to S3 in which the initial value of the direct wave component DC is set to a sufficiently large value, and a value DC' used for calculation of the direct wave component DC smaller than DC2 is zeroed. Then, the control flow goes to S4 to set the initial values of the phase and amplitude of the cancel signal on the basis of the maximum transmission/reception directivity angle θ. The control flow then goes to S5 to set the initial value of the amplification ratio G of the composite-signal amplifying portion 34. Then, the control flow goes to S6 in which the transmitted data generated in S1 are read out from the transmission memory portion 18, AM-modulated by the transmitter/receiver modules 26, and transmitted from the plurality of transmitter/receiver antenna elements 20 toward the radio-frequency tag 14. Then, the control flow goes to SA to execute a cancel signal control illustrated in FIG. 11. The control flow then goes to S7 in which the detected wave signal obtained by the homodyne wave detection by the homodyne wave detector portion 36 is read out from the reception memory portion 44, and interpreted by the reply-data interpreting portion 46, whereby the reply data received from the radio-frequency tag 14 is interpreted. Then, the control flow goes to S8 to increment the maximum transmission/reception directivity angle θ by 15°. The control flow then goes to S9 to determine whether the maximum transmission/reception directivity angle θ is larger than 45°. If a negative determination is obtained in S9, the control flow goes back to S3 and the subsequent steps. If an affirmative determination is obtained in S9, the present routine is terminated. It will be understood that S2, S8 and S9 correspond to an operation of the directivity control portion 56.

Figure 11:
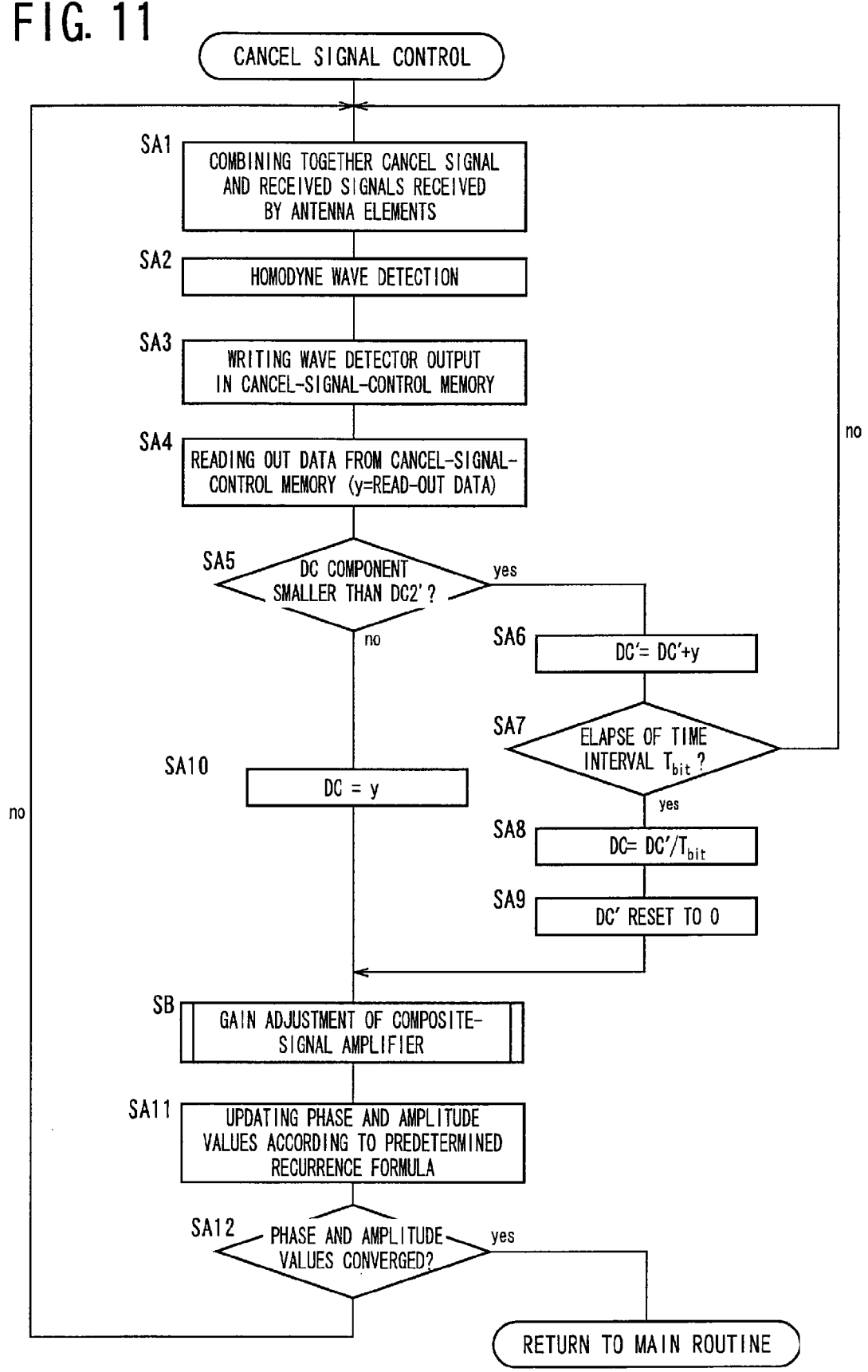
FIG. 11 is a flow chart illustrating a cancel signal control which is a part of the RFID communication control of FIG. 10.

FIG. 11 is a flow chart illustrating the cancel signal control which is a part of the RFID communication control of FIG. 10. This cancel signal control of FIG. 11 is initiated with SA11 corresponding to an operation of the received-signal combining portion 32, in which the received signals received by the plurality of transmitter/receiver modules 26 and the cancel signal generated by the cancel-signal-phase control portion 30 are combined together (summed up) to obtain the composite signal. Then, the control flow goes to SA2 in which the composite signal obtained by the received-signal combining portion 32 and amplified by the composite-signal amplifying portion 34 is subjected to the homodyne wave detection. The control flow then goes to SA3 in which the wave detector output obtained in SA2 is written in the cancel-signal-control memory 52 through the detected-wave-level calculating portion 51, etc. Then, the control flow goes to SA4 to read out the wave detector output y from the cancel-signal-control memory 52. The control flow then goes to SA5 to determine whether the direct wave component DC is smaller than a predetermined value DC2'. If an affirmative determination is obtained in SA5, the control flow goes to SA6 in which the wave detector output y is added to the value DC', and then goes to SA7 to determine whether the one bit time period $T_{bit}$ has elapsed. If a negative determination is obtained in SA7, the control flow goes back to SA1 and the subsequent steps. If an affirmative determination is obtained in SA7, the control flow goes to SA8 in which the direct wave component DC is set to DC'/$T_{bit}$ (average during the time period $T_{bit}$), and then goes to SA9 to reset the value DC' to 0, and further goes to SB. If a negative determination is obtained in SA5, the control flow goes to SA10 in which the direct wave component DC is set to the wave detector output y. Then, the control flow goes to SB to make a gain adjustment of the composite-signal amplifying portion 34 (composite-signal amplifier). Then, the control flow goes to SA11 in which the phase and amplitude of the cancel signal are updated to minimize the direct wave component DC, according to a predetermined recurrence formula well known in the art. The control flow then goes to determine whether the phase and amplitude values have been converged. If a negative determination is obtained in SA12, the control flow goes back to SA1 and the subsequent steps. If an affirmative determination is obtained in SA12, the control flow goes back to the RFID communication control of FIG. 10. It will be understood that the control in SA corresponds to the operations of the cancel-signal generating portion 60 and the cancel-signal control portion (wave-detector-output-level detecting portion) 54.

Figure 12:
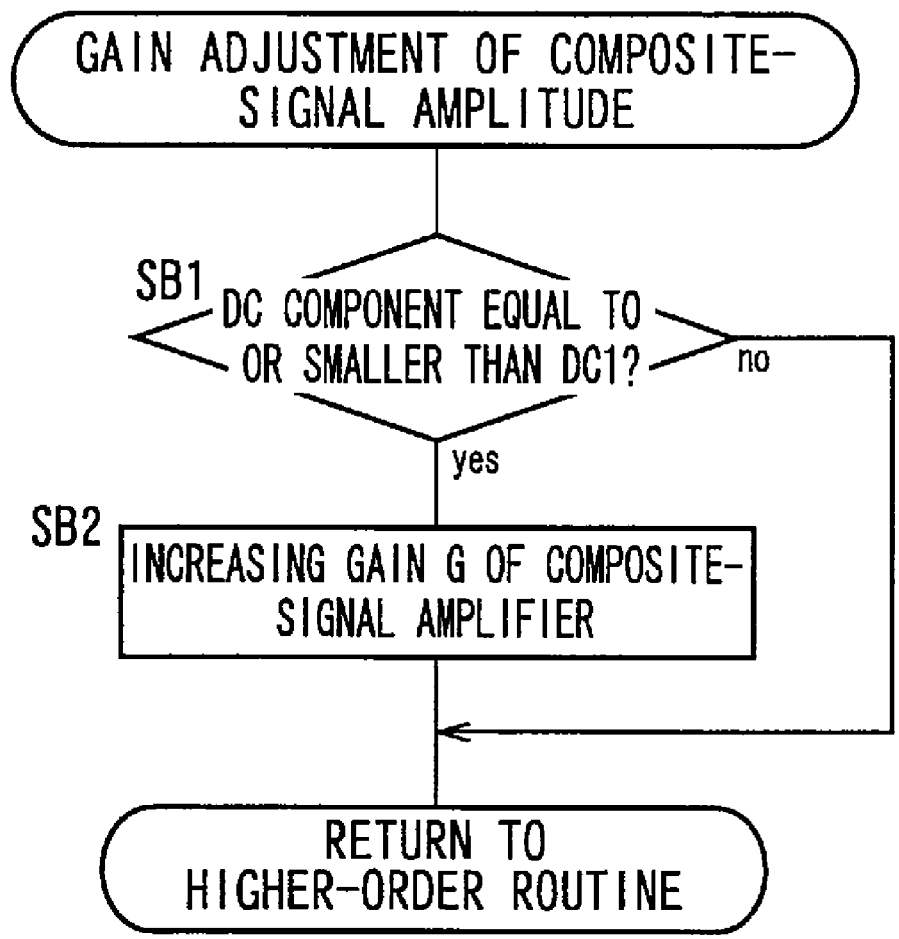
FIG. 12 is a flow chat illustrating a gain adjustment of a composite signal amplifier, which is a part of the cancel signal control illustrated in FIG. 11.

FIG. 12 is a flow chat illustrating the gain adjustment of the composite signal amplifier, which is a part of the cancel signal control of FIG. 11. This gain adjustment of FIG. 12 is initiated with SB1 to determine whether the direct wave component DC is equal to or smaller than a predetermined value DC1. If a negative determination is obtained in SB1, the control flow goes back to the cancel signal control illustrated in FIG. 11. If an affirmative determination is obtained in SB1, the control flow goes to SB2 to increase the amplification gain G of the composite-signal amplifying portion 34 by a predetermined amount, and goes back to the cancel signal control of FIG. 11.

The radio-frequency tag communication device according to the present embodiment described above includes the array antenna device 58 consisting of the plurality of antenna elements 20 for receiving the reply signal, the cancel-signal generating portion 60 (SA) configured to generate the cancel signal for eliminating the leakage signal that is a part of the transmitted signal, which part is received by the array antenna device 58, the cancel-signal control portion 54 'SA) configured to control the phase and/or the amplitude of the cancel signal generated by the cancel-signal generating portion 60, and the received-signal combining portion 32 configured to combine together the received signals received by the plurality of antenna elements 20, to obtaining the composite signal. The present radio-frequency tag communication device 12 is configured to concurrently control the transmission of the transmitted signal and the reception of the received signals, and to apply the cancel signal generated by the cancel-signal generating portion 60 to the received-signal combining portion, 32 for combining together the received signals and the cancel signal, so that the signal/noise ratio of the wave detector output upon demodulation of the composite signal is improved to increase the maximum distance of communication. Namely, the present invention provides the radio-frequency tag communication device 12 having the receiver portion which is simple in construction and which is capable of sufficiently eliminating the leakage signal received from the transmitter portion.

In addition, the present embodiment has an advantage of improved accuracy of detection of the direction of reception of an electric wave on the basis of a direction of a main lobe in which the amplitude of the composite signal obtained by the received-signal combining portion 32 is maximum. Accordingly, the direction in which the radio-frequency tag 14 exists can be accurately detected on the basis of the reply signal transmitted from the radio-frequency tag 14 in response to the transmitted signal.

Further, the present radio-frequency tag communication device further comprises the directivity control portion 56 (S2, S8 and S9) configured to control the directivity of reception of the reply signal. Accordingly, the maximum distance of communication with the radio-frequency tag 14 can be maximized by controlling the directivity of communication with the radio-frequency tag 14.

Further, the directivity control portion 56 controls the directivity of reception by controlling the phases of the received signals received by the plurality of antenna elements 20. Accordingly, the maximum distance of communication can be maximized by controlling the directivity of reception of the reply signal transmitted from the radio-frequency tag.

Further, the cancel-signal control portion 54 sets the initial value of the phase and/or the amplitude of the cancel signal, on the basis of at least one of the directivity of transmission of the transmitted signal and the directivity of reception of the reply signal which are controlled by the directivity control portion 56. Accordingly, the initial value of the phase and/or the amplitude of the cancel signal can be suitably determined.

Further, the radio-frequency tag communication device further comprises the composite-signal amplifying portion 34 configured to amplify the composite signal obtained by the received-signal combining portion 32, the homodyne wave detector portion 36 (SA2) functioning as the demodulating portion configured to demodulate the composite signal amplified by the composite-signal amplifying portion 34, and the cancel-signal control portion 54 functioning as the wave-detector-output-level detecting portion configured to detect the wave detector output level of the demodulated signal generated by the homodyne wave detector portion 36, and also as the amplification-ratio setting portion configured to set the ratio G of amplification of the composite signal by the composite-signal amplifying portion according to the wave detector output level, so that the composite-signal amplifying portion amplifies the composite signal at the amplifying ratio set according to the wave detector output level detected by the wave-detector-output-level detecting portion. Thus, the amplification ratio G of the composite signal is suitably determined according to the wave detector output level, so that the resolution at the first detected-wave-signal A/D converting portion to covert the demodulated signal into the digital signal can be maximized.

Further, the cancel-signal control portion 54 updates the phase and/or the amplitude of the cancel signal, at the time interval shorter than the period of the modulated signal included in the received signals, while the amplification ratio G of the composite signal is lower than the predetermined value. Accordingly, the phase and/or the amplitude of the cancel signal can be suitably controlled by obtaining the direct current component at the sampling interval. before the degree of suppression of the leakage signal is comparatively small.

Further, the cancel-signal control portion 45 updates the phase and/or the amplitude of the cancel signal, at the time interval not shorter than the period of the modulated signal included in the received signals, while the amplification ratio of the composite signal is not lower than the predetermined value. Accordingly, the phase and/or the amplitude of the cancel signal can be suitably controlled by calculating the direct current component from an average of the amplitude of a reflected wave component during the time interval not shorter than the period of the modulated signal, after the degree of suppression of the leakage signal is comparatively large.

Further, the homodyne wave detector portion 36 is configured to perform the orthogonal I-Q modulation of the composite signal amplified by the composite-signal amplifying portion 34, for thereby converting the composite signal into the I-phase signal and the Q-phase signal, and the cancel-signal control portion 54 controls the phase and/or the amplitude of the cancel signal, on the basis of the higher one of the levels of the I-phase and Q-phase signals generated by the homodyne wave detector portion 36, or on the basis of the level of the composite signal of the I-phase and Q-phase signals. Accordingly, the cancel signal can be practically controlled.

Further, the cancel-signal control portion 54 controls the phase and/or the amplitude of the cancel signal, so as to minimize the direct wave component DC of the wave detector output level calculated by the detected-wave-level calculating portion 51. Accordingly, the cancel signal can be practically controlled.

Further, the radio-frequency tag communication device further comprises the transmitter array antenna device 58 consisting of the plurality of antenna elements 20 each provided for transmitting the transmitted signal, and the directivity control portion 56 controls the directivity of transmission of the transmitted signal, by controlling the phase of the transmitted signal to be transmitted from each of the plurality of antenna elements of the transmitter array antenna device. In this case, the maximum distance of communication can be maximized by controlling the directivity of transmission of the transmitted signal.

Further, the cancel-signal control portion 54 sets the initial value of the phase and/or the amplitude of the cancel signal, on the basis of the directivity of transmission of the transmitted signal controlled by the directivity control portion 56. Accordingly, the initial value of the phase and/or the amplitude of the cancel signal can be suitably determined.

There will be described in detail other preferred embodiments of this invention, by reference to the drawings. In the following description, the same reference signs as used in the preceding embodiment will be used to identify the corresponding elements, which will not be described.

Second Embodiment

Figure 13:
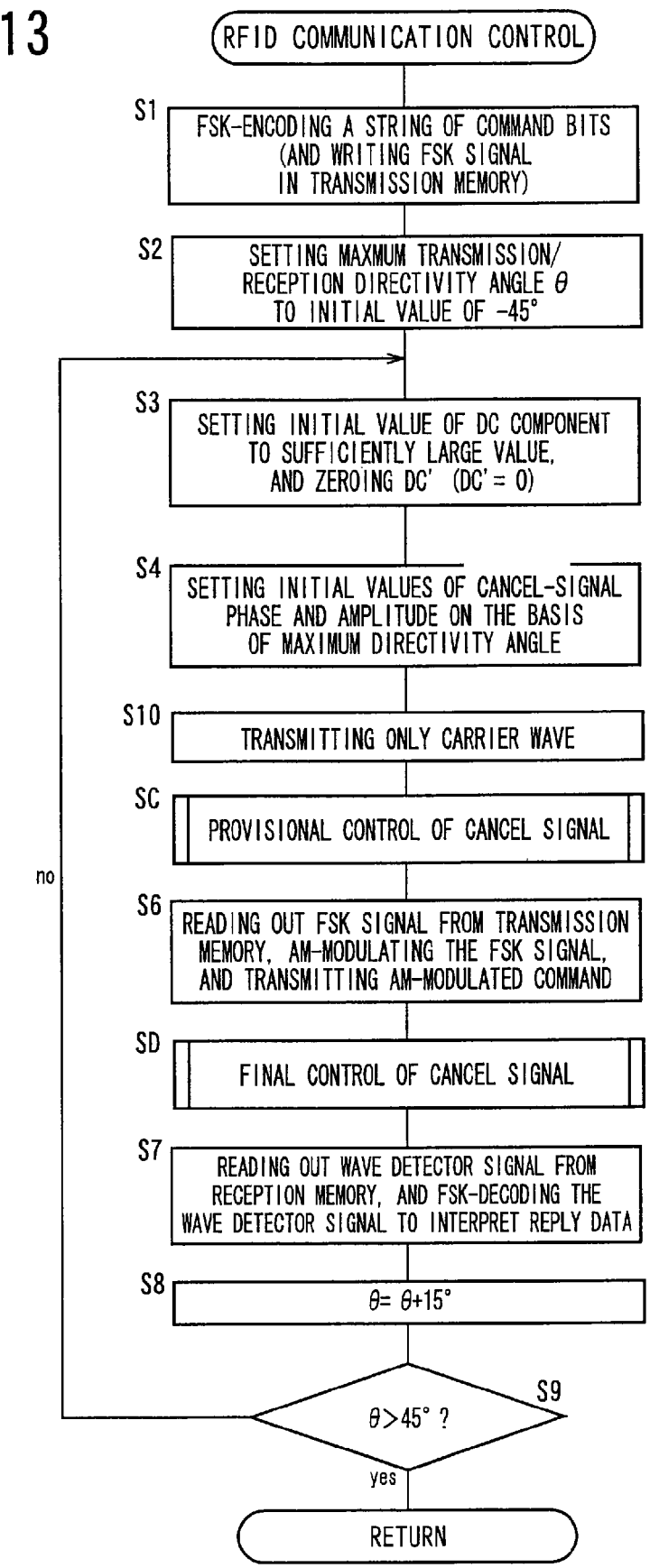
FIG. 13 is a flow chat illustrating another example of the RFID communication control for radio communication of the radio-frequency tag communication device of FIG. 2 with the radio frequency tag of FIG. 3.

FIG. 13 is a flow chat illustrating another example of the RFID communication control for radio communication of the radio-frequency tag communication device 12 with the radio frequency tag 14. This RFID communication control is repeatedly executed with a predetermined cycle time. It is noted that the same reference signs as used in FIG. 10 will be used to identify the same steps, which will not be described.

Figure 14:
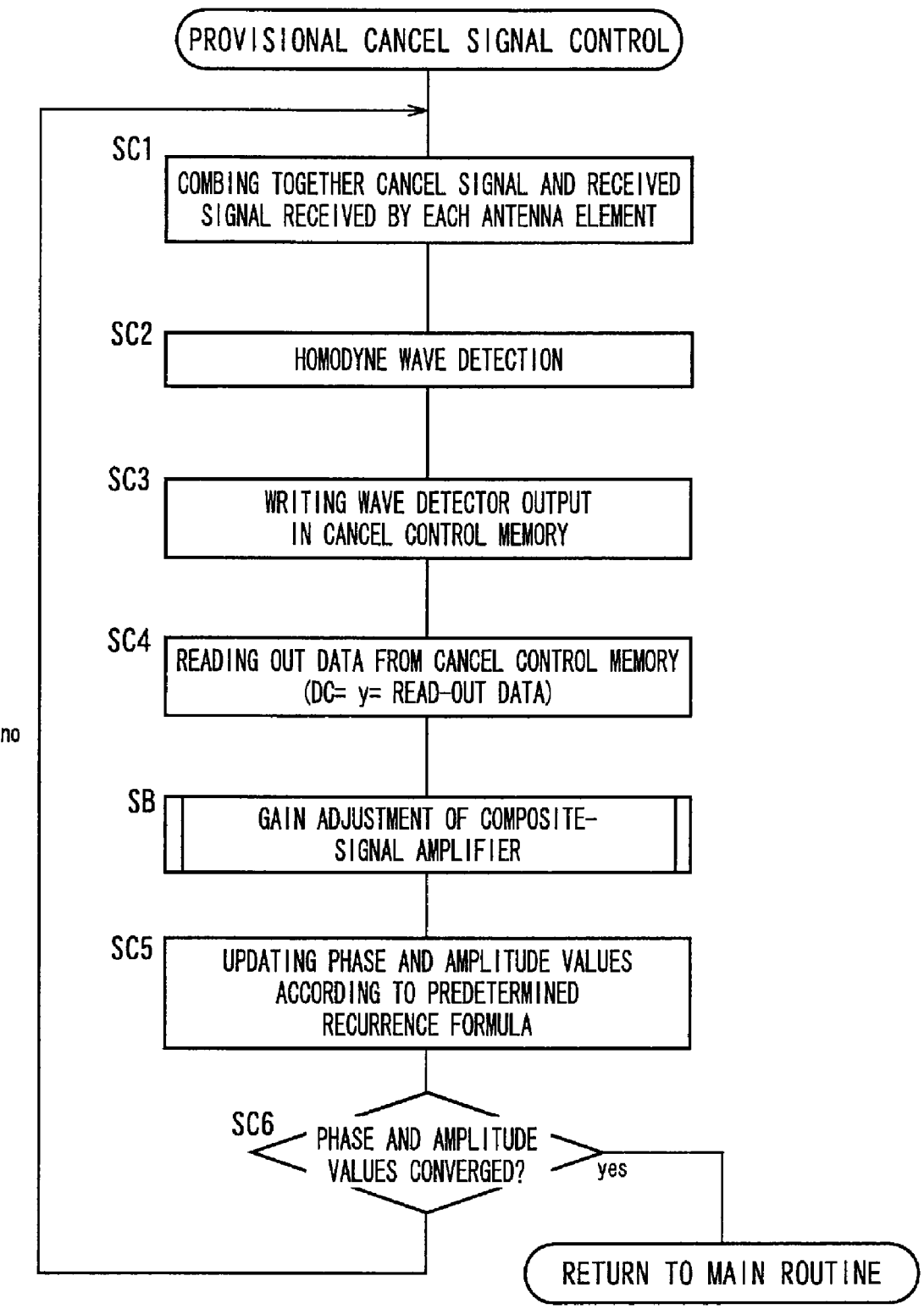
FIG. 14 is a flow chat illustrating a provisional cancel signal control, which is a part of the RFID communication control illustrated in FIG. 13.
Figure 15:
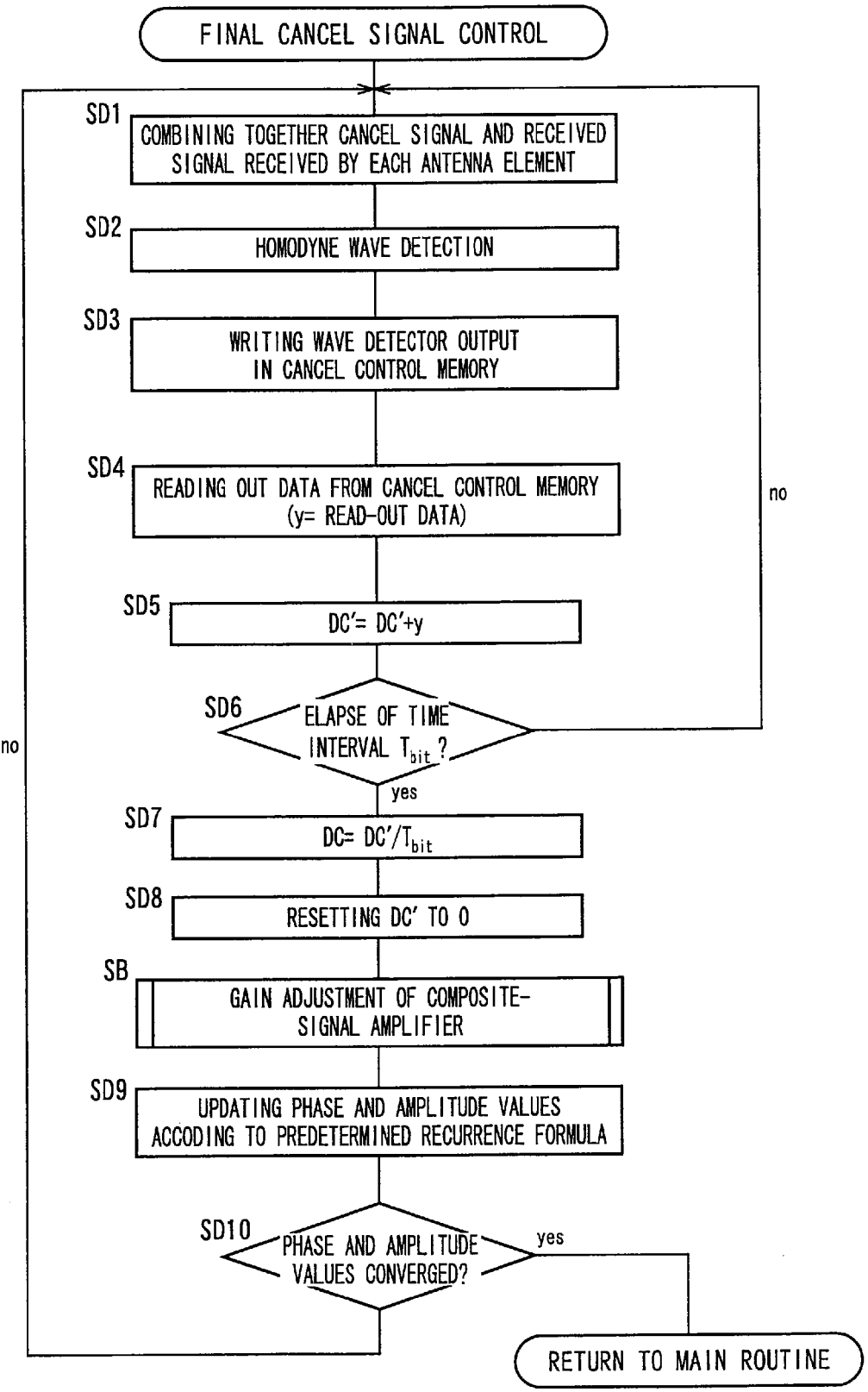
FIG. 15 is a flow chart illustrating a final cancel signal control, which is a part of the RFID communication control illustrated in FIG. 13.

In the RFID communication control shown in FIG. 13, the above-described step S4 is followed by S10 in which the carrier wave not including any command is transmitted from each of the plurality of transmitter/receiver antenna elements 20, toward the radio-frequency tag 14. Then, the control flow goes to SC in which a provisional control of the cancel signal illustrated in FIG. 14 is implemented. The control flow then goes to the step S5 described above, and further goes to SD in which a final control of the cancel signal illustrated in FIG. 15 is implemented. Then, the above-described step S7 and the subsequent steps are implemented.

FIG. 14 is a flow chat illustrating the provisional cancel signal control, which is a part of the RFID communication control illustrated in FIG. 13. This provisional cancel signal control illustrated in FIG. 14 is initiated with SC1 to combine together (sum up) the received signals generated by the plurality of transmitter/receiver modules 26 and the cancel signal generated by the cancel-signal-phase control portion 30. Then, the control flow goes to SC2 in which the composite signal generated by the received-signal combining portion 32 and amplified by the composite-signal amplifying portion 34 is subjected to the homodyne wave detection. The control flow then goes to SC3 to write the wave detector output into the cancel-signal-control memory 52 through the detected-wave-level calculating portion 51, etc. Then, the control flow goes to SC4 in which the wave detector output y is read out from the cancel-signal-control memory 52, and the direct wave component DC is set equal to the wave detector output y. The control flow then goes to SB to make the adjustment of the gain of the composite signal illustrated in FIG. 12. Then, SC6 is implemented to update the phase and amplitude of the cancel signal according to the recurrence formula well known in the art, so as to minimize the direct wave component DC. Then, the control flow goes to SC6 to determine whether the phase and amplitude values of the composite signal have been converged, or not. If a negative determination is obtained in SC6, the control flow goes back to SC1 and the subsequent steps. If an affirmative determination is obtained in SC6, the control flow returns to the present RFID communication control illustrated in FIG. 13.

FIG. 15 is a flow chart illustrating the final cancel signal control, which is a part of the RFID communication control illustrated in FIG. 13. This final cancel signal control illustrated in FIG. 15 is initiated with SD1 to combine together (sum up) the received signals generated by the plurality of transmitter/receiver modules 26 and the cancel signal generated by the cancel-signal-phase control portion 30. Then, the control flow goes to SD2 in which the composite signal generated by the received-signal combining portion 32 and amplified by the composite-signal amplifying portion 34 is subjected to the homodyne wave detection. The control flow then goes to SD3 to write the wave detector output into the cancel-signal-control memory 52 through the detected-wave-level calculating portion 51, etc. Then, the control flow goes to SD4 in which the wave detector output y is read out from the cancel-signal-control memory 52. The control flow then goes to SD5 to increment the value DC' by the wave detector output y, and to SD6 to determine whether the one-bit time period $T_{bit}$ has elapsed. If a negative determination is obtained in SD6, the control flow goes back to SD1 and the subsequent steps. If an affirmative determination is obtained in SD6, the control flow goes to SD7 in which the direct wave component DC is set equal to $DC'/T_{bit}$. Then, the control flow goes to SD8 to reset the value DC' to 0. The control flow then goes to SD to make the gain adjustment of the composite signal amplifier as illustrated in FIG. 12. Then, the control flow goes to SD9 in which the phase and amplitude of the cancel signal are updated according to the predetermined recurrence formula, so as to minimize the direct wave component DC. The control flow then goes to SD10 to determine whether the phase and amplitude values of the composite signal have been converged, or not. If a negative determination is obtained in SD10, the control flow goes back to SD1 and the subsequent steps. If an affirmative determination is obtained in SD10, the control flow returns to the present RFID communication control illustrated in FIG. 13. It will be understood that the control is the SC and SD corresponds to the operations of the cancel-signal generating portion 60 and the cancel-signal control portion (wave-detector-output-level detecting portion) 54, and that the SC1 and SD1 correspond to the operation of the received-signal combining portion 32, while the SC2 and SD2 correspond to the operation of the homodyne wave detector portion 36.

In the present embodiment described above, the cancel-signal control portion 54 (SC and SD) is configured to first transmit the carrier wave not including any command, toward the radio-frequency tag 14, to perform the provisional control of the cancel signal on the basis of the reply signal transmitted from the radio-frequency tag 14 in response to the carrier wave, to transmit the transmitted signal including a predetermined command, toward the radio-frequency tag 14, and to perform the final control of the cancel signal on the basis of the reply signal transmitted from the radio-frequency tag 14 in response to the transmitted signal. In this case, the provisional control of the cancel signal is implemented on the basis of the wave detector output not requiring a decoding operation of the reply signal, prior to the final control of the cancel signal, so that the leakage signal can be more efficiently eliminated.

Third Embodiment

Figure 16:
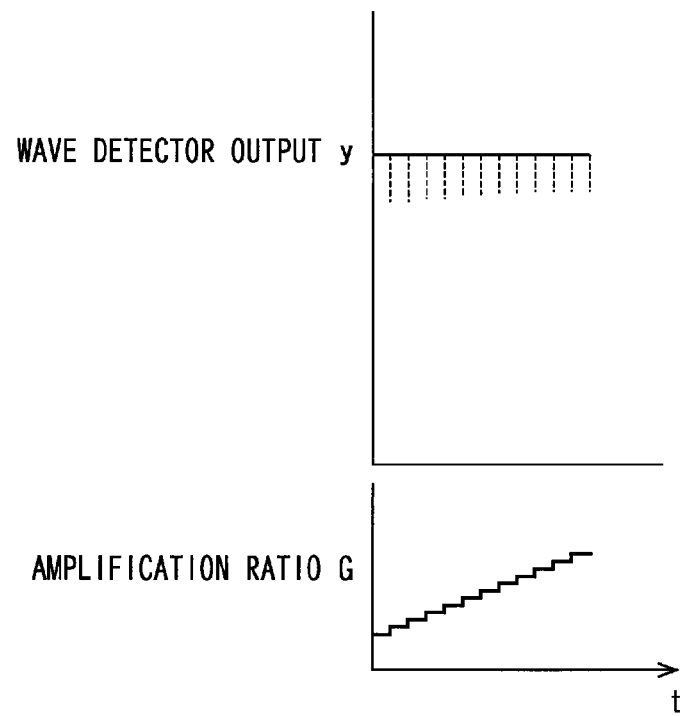
FIG. 16 is a view for explaining another example of adjustment of the amplification ratio of the composite-signal amplifying portion of the radio-frequency tag communication device of FIG. 2.

FIG. 16 is a view for explaining another example of adjustment of the amplification ratio G of the composite-signal amplifying portion 34. As shown in FIG. 16, the ratio G of amplification of the composite signal by the composite-signal amplifying portion 34 is set each time the phase and/or the amplitude of the cancel signal is/are updated by the cancel-signal control portion 54. Accordingly, the resolution at the first detected-wave-signal A/D converting portion 42 to covert the demodulated signal into the digital signal can be maximized.

The preferred embodiments of the present invention have been described in detail by reference to the drawings, it is to be understood that the present invention are not limited to the illustrated embodiments, but may be otherwise embodied.

In the preceding embodiments, the homodyne wave detector portion 36, the cancel-signal control portion 54, the directivity control portion 56, etc. are separate control devices. However, the separate control devices are not essential according to the present invention. For instance, the homodyne wave detector portion 36, the cancel-signal control portion 54, the directivity control portion 56, etc. may be functional portions of a DSP (Digital Signal Processor) which is a so-called microcomputer system incorporating a CPU, a ROM and a RAM and operating to perform a signal processing operation according to a program stored in the ROM, while utilizing a temporary data storage function of the RAM. Those portions may be arranged to perform either a digital or analog signal processing operation.

The radio-frequency tag communication device 12 according to the preceding embodiments is provided with the transmitter/receiver array antenna device 58 provided to transmit the transmitted signal and to receive the reply signal transmitted from the radio-frequency tag 14 in response to the transmitted signal. However, the radio-frequency tag communication device 12 may be provided with both of a transmitter array antenna device and a receiver array antenna device, which are separate from each other.

It is to be understood that the present invention may be embodied with various other changes and modifications, without departing from the sprint of the present invention.

What is claimed is:

1. A radio-frequency tag communication device configured to transmit a transmitted signal toward a radio-frequency tag, and to receive a reply signal transmitted from the radio-frequency tag in response to the transmitted signal, for thereby effecting radio communication with the radio-frequency tag, said radio-frequency tag communication system comprising:

a receiver array antenna device consisting of a plurality of antenna elements each provided for receiving said reply signal;

a cancel-signal generating portion configured to generate a cancel signal for eliminating a leakage signal that is a part of said transmitted signal, which part is received by said receiver array antenna device;

a cancel-signal control portion configured to control a phase and/or an amplitude of said cancel signal generated by said cancel-signal generating portion;

a received-signal combining portion configured to combine together received signals received by said plurality of antenna elements, to obtain a composite signal; and a directivity control portion configured to control a directivity of reception of said reply signal, said radio-frequency tag communication device being configured to concurrently control the transmission of said transmitted signal and the reception of said received signals, and to apply said cancel signal generated by said cancel-signal generating portion to said received-signal combining portion, for combining together the received signals and the cancel signal, and said cancel-signal control portion sets an initial value of the phase or the amplitude, or both, of said cancel signal, on the basis of the directivity of reception of said reply signal controlled by said directivity control portion.

2. The radio-frequency tag communication device according to claim 1 wherein said directivity control portion controls the directivity of reception, by controlling phases of the received signals received by said plurality of antenna elements.

3. The radio-frequency tag communication device according to claim 1, further comprising:

a composite-signal amplifying portion configured to amplify said composite signal obtained by said received-signal combining portion;

a demodulating portion configured to demodulate the composite signal amplified by said composite-signal amplifying portion;

a wave-detector-output-level detecting portion configured to detect a wave detector output level of a demodulated signal as generated by said demodulating portion; and an amplification-ratio setting portion configured to set a ratio of amplification of said composite signal by said composite-signal amplifying portion, according to said wave detector output level detected by said wave-detector-output-level detecting portion.

4. The radio-frequency tag communication device according to claim 3, wherein said cancel-signal control portion updates the phase and/or the amplitude of said cancel signal, at a time interval shorter than a period of a modulated signal included in said received signals, while the ratio of amplification of said composite signal is lower than a predetermined value.

5. The radio-frequency tag communication device according to claim 3, wherein said cancel-signal control portion updates the phase and/or the amplitude of said cancel signal, at a time interval not shorter than a period of a modulated signal included in said received signals, while the ratio of amplification of said composite signal is not lower than a predetermined value.

6. The radio-frequency tag communication device according to claim 3, wherein said amplification-ratio setting portion sets the radio of amplification of said composite signal by the composite-signal amplifying portion each time the phase and/or the amplitude of said cancel signal is/are updated by said cancel-signal control portion.

7. The radio-frequency tag communication device according to claim 3, wherein said demodulating portion is configured to perform orthogonal I-Q modulation of the composite signal amplified by the composite-signal amplifying portion, for thereby converting said composite signal into an I-phase signal and a Q-phase signal, and said cancel-signal control portion controls the phase and/or the amplitude of said cancel signal, on the basis of a higher one of levels of said I-phase and Q-phase signals generated by said demodulating portion, or on the basis of a level of a composite signal of said I-phase and Q-phase signals.

8. The radio-frequency tag communication device according to claim 3, wherein said cancel-signal control portion controls the phase and/or the amplitude of said cancel signal, so as to minimize a direct wave component of said wave detector output level detected by said wave-detector-output-level detecting portion.

9. The radio-frequency tag communication device according to claim 1, wherein said cancel-signal control portion is configured to first transmit a carrier wave not including any command, toward said radio-frequency tag, to perform a provisional control of said cancel signal on the basis of the received signals received by said plurality of antenna elements of said receiver arrange antenna device applied to said received-signal combining portion as a result of transmission of said carrier wave, to transmit said transmitted signal including a predetermined command, toward said radio-frequency tag, and to perform a final control of said cancel signal on the basis of said reply signal transmitted from said radio-frequency tag in response to said transmitted signal.

10. The radio-frequency tag communication device according to claim 1, further comprising a transmitter array antenna device consisting of a plurality of antenna elements each provided for transmitting said transmitted signal, and wherein said directivity control portion controls a directivity of transmission of said transmitted signal, by controlling a phase of said transmitted signal to be transmitted from each of said plurality of antenna elements of said receiver array antenna device.

11. The radio-frequency tag communication device according to claim 10, wherein said cancel-signal control portion sets an initial value of the phase and/or the amplitude of said cancel signal, on the basis of the directivity of transmission of said transmitted signal controlled by said directivity control portion.

* * * * *